(No Model.)
J. W. LEVY.
FLY TRAP.
No. 353,076. Patented Nov. 23, 1886.
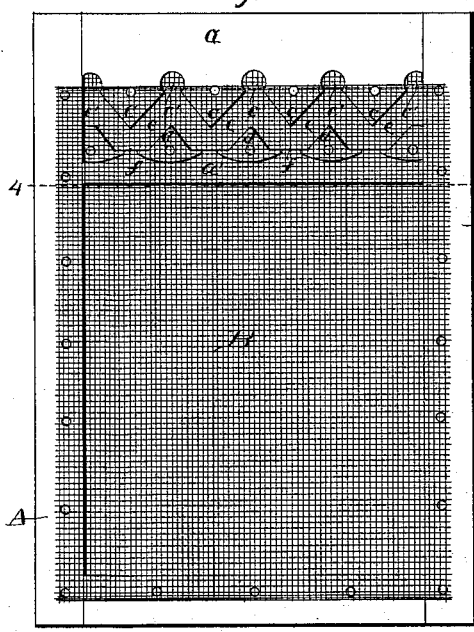
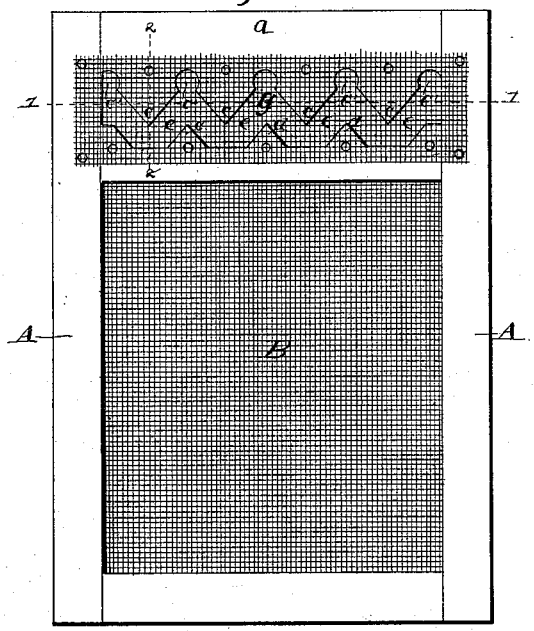
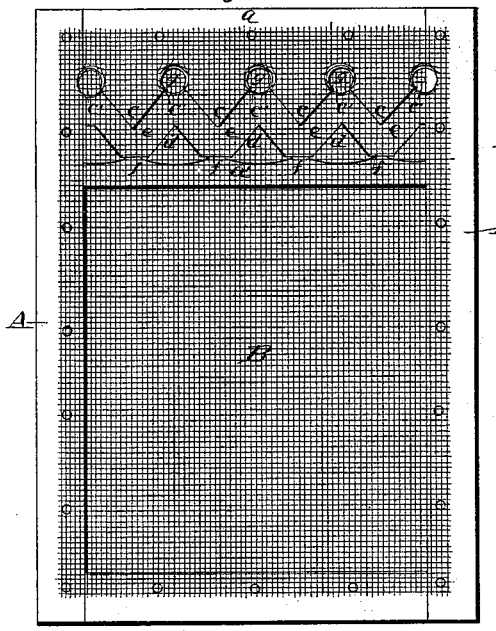
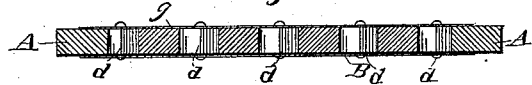
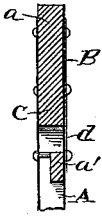
Witnesses
Chas. L. Taylor
E. G. Siggers
Inventor
James W. Levy
By his Attorneys
C. A. Snow & Co.
N. PETERS, Photo-Lithographer, Washington, D. C.

ical faces of thestrip,and thescreens -

UNITED STATES PATENT OFFICE.

JAMES W. LEVY, OF CLINTON, MISSOURI.

FLY-TRAP.

SPECIFICATION forming part of Letters Patent No. 353,076, dated November 23, 1886.

Application filed July 2, 1886. Serial No. 206,964. (No model.)

*To all whom it may concern:*

Be it known that I, JAMES W. LEVY, a citizen of the United States, residing at Clinton, in the county of Henry and State of Missouri, have invented a new and useful Improvement in Fly-Traps, of which the following is a specification.

My invention relates to what are known as "fly-trap attachments for window-screens," the purpose of which is to exclude flies from the room, and at the same time to permit their escape therefrom.

The object of my invention is to provide window-screens with an attachment which shall serve as a true trap for the insect by preventing its return into the room after having once entered the trap, and also insure the escape of the insect out of the room.

To the above purposes my invention consists in certain peculiar and novel features of construction and arrangement, as hereinafter described and claimed.

In order that my invention may be fully understood, I will proceed to describe it with reference to the accompanying drawings, in which—

Figure 1 is an outer side elevation of one form of my invention. Fig. 2 is an inner side elevation of the same. Fig. 3 is an outer side elevation of a modified form of my invention. Fig. 4 is a transverse sectional view on the line 4 4 of Fig. 1, looking toward the top of the screen. Fig. 5 is a transverse section on the line 1 1, Fig. 2. Fig. 6 is a short longitudinal section on the line 2 2, Fig. 2.

In the said drawings, A designates the frame of a window-screen, and B designates the woven wire forming the screen proper. The upper cross-piece, $a$, of the frame is formed or provided on its lower edge with downwardly-extending V-shaped projections $c$, while between each pair of these projections the lower edge of the piece $a$ is cut away to form recesses $c'$, which may be either circular or of any other form, as desired. Beneath the upper cross-piece, $a$, is placed a cross-piece, $a'$, extending parallel to the upper cross-piece, and at some distance from it. On its upper edge this cross-piece $a'$ is formed or provided with a series of V-shaped projections, $d$, which extend also laterally beyond the front side of said cross-piece, as shown in Fig. 4. The projections $d$ are so arranged relatively to the projections $c$ as to extend toward the spaces between the latter, and vice versa, so that a series of zigzag ways, $e$, are formed by the oblique sides of the projections $c$ $d$, each of said channels beginning at openings $f$ between projections $d$, and terminating in the recesses $c'$ between projections $c$.

On the inner side of the screen is secured a piece of woven wire, $g$, covering the projections $c$ $d$ and recesses $c'$ $f$, so that the zigzag channels $e$ are inclosed by the wire $g$ on one side, and by the wire B on the other side.

In Figs. 1 and 2 my improvement is shown as applied to a new screen, and in this case the netting is stopped at the recesses $c'$, while in Fig. 3 my improvement is shown as applied to an old screen, the meshes of the netting B being opened at the recesses $c'$, to form holes $g$ in line with said recesses.

When the fly lights upon the inner surface of the screen B it will travel upward and enter the trap through the openings $f$, and will be guided by the zigzag channels $e$ to the recesses $c'$, out of which it will escape to the outer air. It will thus be seen that my attachment acts as a true trap, and that it is simple and capable of attachment to either old or new screens.

Having thus described my invention, what I claim as new, and desire to secure by Letters Patent, is—

1. A fly-trap attachment for window-screens, consisting of the parallel strips arranged out of contact with each other and provided with projections on their opposing edges, which alternate with each other to form a channel substantially zigzag in form, and the screens partially covering the said strips on opposite sides and forming the inlet and outlet openings, substantially as described.

2. A fly-trap attachment for window-screens, consisting of the upper and lower strips arranged parallel and out of contact with each other and provided with projections on their opposing edges, which alternate with each other to form a channel substantially zigzag in form, the projections $d$ on the upper edge of the lower strip being of greater thickness than the strip itself and extended beyond one of the vertical faces of the strip, and the screens-partially covering the strips on opposite sides and forming the inlet and outlet openings, substantially as described, for the purpose set forth.

3. The combination of a frame having the upper cross-piece, $a$, provided with the V-shaped projections $c$, and the intermediate recesses, $c'$, the lower cross-piece, $a'$, having the V-shaped projections $d$, which alternate with the corresponding projections, $c$, on the strip $a$, and the lateral extensions $d'$, arranged as described, the inner screen, $g$, covering the said cross-pieces on one side, and the screen B, partially covering the cross-pieces on their opposite sides, substantially as described, for the purpose set forth.

In testimony that I claim the foregoing as my own I have hereto affixed my signature in presence of two witnesses.

JAMES W. LEVY.

Witnesses:
 THOS. W. PATTERSON,
 GEO. S. HOLLIDAY.